United States Patent
Warkentin et al.

(10) Patent No.: US 11,157,671 B2
(45) Date of Patent: Oct. 26, 2021

(54) METHOD OF CHECKING EQUIVALENCE BETWEEN A FIRST DESIGN COMPRISING A SHIFT REGISTER LOGIC SRL CHAIN AND A SECOND DESIGN

(71) Applicant: Onespin Solutions GmbH, Munich (DE)

(72) Inventors: Peter Warkentin, Munich (DE); Arun Chandrasekharan, Munich (DE); Tobias Welp, Munich (DE)

(73) Assignee: OneSpin Solutions GmbH, Munich (DE)

( * ) Notice: Subject to any disclaimer, the term of this patent is extended or adjusted under 35 U.S.C. 154(b) by 0 days.

(21) Appl. No.: 16/920,484

(22) Filed: Jul. 3, 2020

(65) Prior Publication Data
US 2021/0004513 A1  Jan. 7, 2021

(30) Foreign Application Priority Data
Jul. 3, 2019  (LU) ........................................ 101294

(51) Int. Cl.
*G06F 30/3323* (2020.01)
*G06F 119/16* (2020.01)

(52) U.S. Cl.
CPC ...... *G06F 30/3323* (2020.01); *G06F 2119/16* (2020.01)

(58) Field of Classification Search
CPC .......................... G06F 30/3323; G06F 2119/16
USPC ....................................................... 716/107
See application file for complete search history.

(56) References Cited

U.S. PATENT DOCUMENTS

| | | | | |
|---|---|---|---|---|
| 6,053,949 A * | 4/2000 | Takai | ...................... | G06F 30/33 703/15 |
| 7,203,890 B1 * | 4/2007 | Normoyle | ........... | G06F 11/1016 714/763 |
| 7,685,542 B2 * | 3/2010 | Grise | ............ | G01R 31/318594 716/136 |
| 8,181,134 B2 * | 5/2012 | Baumgartner | ...... | G06F 30/3323 716/107 |
| 8,285,527 B2 * | 10/2012 | Rahim | .................. | G06F 30/327 703/2 |
| 8,769,450 B1 * | 7/2014 | Tian | .................... | G06F 30/3323 716/103 |
| 8,943,457 B2 * | 1/2015 | Sanghani | ....... | G01R 31/318583 716/136 |

(Continued)

OTHER PUBLICATIONS

Chiueh Tzi -Dar et al: "OFDM Baseband Receiver Design for Wireless Communications" In: 'OFDM Baseband Receiver Design for Wireless Communications', Apr. 15, 2008 (Apr. 15, 2008), John Wiley & Sons, XP055678358, pp. 1-352.

(Continued)

*Primary Examiner* — Suresh Memula
(74) *Attorney, Agent, or Firm* — 24IP Law Group USA, PLLC; Timothy DeWitt

(57) ABSTRACT

A method of checking equivalence between a first design comprising a shift register logic SRL chain and a second design comprising a memory block. The method comprises identifying an inductive invariant to replace the SRL chain or the memory block, and replacing the SRL chain and the memory block by a set of constraints, wherein the set of constraints state that the SRL chain and the memory block are equivalent for the checking of equivalence between the first design and the second design.

15 Claims, 8 Drawing Sheets

(56) References Cited

U.S. PATENT DOCUMENTS

| | | | | |
|---|---|---|---|---|
| 2005/0289486 A1* | 12/2005 | Caron | ................. | G06F 30/3323 |
| | | | | 716/107 |
| 2006/0190864 A1* | 8/2006 | Ganai | ................. | G06F 30/3323 |
| | | | | 716/107 |
| 2008/0209370 A1* | 8/2008 | Koelbl | ................ | G06F 30/3323 |
| | | | | 716/107 |
| 2008/0313579 A1* | 12/2008 | Larouche | .............. | G06F 30/331 |
| | | | | 716/103 |
| 2008/0313589 A1* | 12/2008 | Maixner | ............... | G06F 30/331 |
| | | | | 716/113 |

OTHER PUBLICATIONS

Xilinx: RAM-based Shift Register v11.0, Mar. 1, 2011 (Mar. 1, 2011), pp. 1-8, XP055678360, Retrieved from the Internet: URL:http://www-inst.eecs.berkeley.edu/-cs1 50/fa13/resources/shift ram ds228.pdf [retrieved on Mar. 2, 2020(3].

Tzi-Dar Chiueh and Pei-Yun Tsai, "OFDM Baseband Receiver Design for Wireless Communications" 2007 John Wiley & Sons (Asia) Pte Ltd. ISBN: 978-0-470-82234-0.

"RAM-based Shift Register v11.0" from Xilinix, DS228 Mar. 1, 2011, pp. 1-8, XP055678360.

\* cited by examiner

Step S1 => Step S2 => Step S3

METHOD OF CHECKING EQUIVALENCE BETWEEN A FIRST DESIGN COMPRISING A SHIFT REGISTER LOGIC SRL CHAIN AND A SECOND DESIGN

CROSS-REFERENCE TO RELATED APPLICATIONS

The present application claims priority to patent application No. LU101294 filed in Luxembourg on Jul. 3, 2019, entitled "METHOD OF CHECKING EQUIVALENCE BETWEEN A FIRST DESIGN COMPRISING A SHIFT REGISTER LOGIC SRL CHAIN AND A SECOND DESIGN COMPRISING A MEMORY BLOCK." The aforementioned patent application is hereby incorporated by reference in its entirety.

BACKGROUND OF THE INVENTION

Field of the Invention

The present invention generally relates to formal verification of logic circuits, in particular to a method enabling implementation verification of circuits where shift registers are implemented using memories. More particularly, the present invention concerns a computer implemented method of equivalence checking of different synthesis transformations of shift register or first-in-first-out logic to a functionally equivalent circuit containing memory elements.

Brief Description of the Related Art

Formal verification applied for hardware or software verification is the act of proving or disproving the correctness of intended algorithms underlying a system with respect to a certain formal specification or among the different implementations of the underlying algorithms. In equivalence checking different logical implementations are formally verified to be functionally equivalent under all possible input combinations.

SRL2MEMORY transformation converts a shift register logic (SRL) chain to a functionally equivalent circuit containing a memory block (RAM, SRAM, DRAM, Magnetic RAM, Block RAM etc.) as the core element. An SRL logic is alternately called a First In First Out (FIFO) scheme. An input design to the synthesis tool is denoted the golden design and the resulting netlist from synthesis as the revised design. The resulting netlist can be in a generic technology independent form or mapped to a target fabrication technology, or in an intermediate optimization stage.

In the case of the SRL2MEMORY transformation, successive shifting of input data through the SRL in the golden design is transformed to memory-write operations to distinct memory locations in the revised design.

FIGS. 1A-1B explain a principle of a transformation between a shift register logic (SRL) chain 10 into an equivalent memory circuitry 20.

For each clock clk, a new data is input to the dg-input of the SRL. The length of the SRL is n. Hence, it takes n clock cycles to shift the data through the SRL. The corresponding memory storage elements and the associated circuitry in the revised netlist are shown in FIG. 1B. The revised design includes a read counter (RC) that points to the address of the memory where the output data is available. The write-address of the memory is computed from the read-address with an offset n, the length of the SRL chain.

As shown in FIGS. 1A-1B, the individual elements of the SRL chain are denoted as s(0) to s(n−1), where n is the length of the SRL chain. The depth of the memory on the revised design is m.

The general working principle is as follows: For each shift operation in the SRL chain, the data within each register gets moved to the respective subsequent register within the SRL chain. Corresponding to this, on the revised design, each shift operation results in the write-address and the read-address point to the next read and write locations of the memory. Thus, the input data is stored in successive memory cells and the output data is available at the location with an offset n. In the SRL, after n clock cycles, the current input data will be moved n times and emitted at the $out_g$ port. On the revised design, after n cycles, the read-count points to the location where the data was written n cycles earlier. This data is emitted at the outr port of the memory.

As an illustration, a four stage SRL chain 10 and the corresponding memory 20 is shown in FIG. 2. Data A, B, C, D, E, F is shifted into the SRL chain, one per clock cycle. The individual steps corresponding to each clock cycle is shown in FIG. 2. Initially, the SRL registers and the memory elements are cleared (i.e., set to 0). This is shown in FIG. 2 Step 1. After the application of the 1st clock, data A is stored in the 1st SRL register. On the revised design, the data is stored in the location pointed to by $w_{addr}$ indicating the write-address. In this case, the write-address is RC+4, since 4 is the length of the SRL chain. Next, the read-counter is incremented by one and points to the next location. The effective write-address now wraps around to the 1st storage location of the memory. This is shown in FIG. 2 Step 5. Continuing this, after four clock cycles, the data, A, is emitted from the SRL chain. On the revised design, the read-counter points to the original location where A was written into. The step is shown in FIG. 2 Step 5. The cycle continues maintaining the effective offset between the read-address and the write-address in the revised design as four.

In general, there are no structural or internal equivalence points between the golden and revised designs since both the logic and the operations are entirely different between these designs. Due to this it is not possible to derive an inductive hypothesis based on such structural equivalence points and the equivalence check cannot be resolved using combinational equivalence checking. At the same time, sequential equivalence techniques are not practical because of state-space explosion. For simulation based verification the number of input vectors to be simulated is simply beyond the range of practical computing. As an example, a basic 1-kilobyte 32-bit word memory will need 2**32*1024 (more than 4 trillion) input vectors to be tried exhaustively to verify the functional equivalence.

There is therefore a need for a scalable equivalence checking technique for the Shift Register Logic (SRL) to memory synthesis transformation.

SUMMARY OF THE INVENTION

The present invention proposes a computer implemented method according to claim 1. In particular, the present invention proposes a computer implemented method of checking equivalence between a first design comprising a shift register logic SRL chain and a second design comprising a memory block. The method comprises identifying an inductive invariant to replace the SRL chain or the memory block, replacing the SRL chain and the memory block by a set of constraints, wherein the set of constraints state that the SRL chain and the memory block are equivalent for the checking of equivalence between the first design and the second design.

In a first step, a plurality of properties C.1 through C.5 are proved using model checking. In a second step, the SRL chain and the memory block circuit are removed and the assertion dg=dr that the input data of SRL chain in the first design and the input data of the memory block in the second design are equivalent and the assumption outg=outr that the output data of SRL chain in the first design and the output data of the memory block in the second design are equivalent are added. This second step is only valid if the properties C.1 through C.5 have been proved to hold. If the properties hold, the validity of the step follows from a set of theorems. With other words, the set of constraints comprises the assumption that an output of the SRL chain is functionally equivalent to an output of the memory block when an SRL chain input is equivalent to a memory block input.

In a final step, conventional equivalence checking is applied to prove the rest of the circuit.

The present method simplifies the equivalence checking problem by reducing the SRL2MEMORY transformation to a set of minimal constraints that are added to the complete verification problem.

In an aspect, the step of identifying the inductive invariant comprises establishing/verifying a plurality of conditions representative of the transformation from said SRL chain to said memory block, and verifying of a set of theorems using said plurality of conditions to prove that the SRL chain in the first design is formally equivalent to the memory circuitry in the second design The memory block comprises a read-address and a write-address, and in an aspect, the method comprises maintaining an offset between the read-address and the write-address, whereby the offset corresponds to the length of the SRL chain.

In an aspect, the plurality of conditions comprise at least the following conditions: —the initial states for the SRL chain and the memory block are equivalent,—the first design implements a shift register; the revised memory block is written at the location pointed to by a write address $W_{addr}$ and read from the location pointed to by a read address $R_{addr}$;—the read and write addresses in the revised memory block maintain an offset n;—the write address $W_{addr}$ is implemented by a counter.

In another aspect, any counting scheme in the revised with an effective offset between the read address Raddr and the write address $W_{addr}$ is maintained.

An enable signal may be provided.

In an aspect, an asynchronous clear (aclr) is provided, so that registers of the SRL chain can be directly reset using the asynchronous clear aclr signal independent of the clock signal. A synchronous reset (rst) may also be provided, so that the registers of the SRL chain can be synchronously reset using the synchronous reset rst signal wrt. to the clock signal.

In another aspect, the input stage of the memory block is buffered with one or more stages of registers in the revised design.

In an aspect, an effective offset between the read address and write address of the memory block is the difference between the length of the SRL chain (n) and the number the one or more stages of input registers(p), to account for p stages of input registers.

The enable signal in the revised design may be registered to form a delayed enreg signal which is further applied as the enable signal of the core memory block storage elements.

The output of the memory may be buffered with one or more stages of the output registers in the revised side. In an aspect the number of such output registers after the core memory block is deduced using state-reachability analysis.

The revised memory may result in a parallel or cascaded memory configuration.

In an aspect, the width of the SRL chain is more than one.

The present invention also proposes a computer program product comprising means for performing such a method.

The present method simplifies the equivalence checking problem by reducing the SRL2MEMORY transformation to a set of minimal constraints that are added to the complete verification problem.

BRIEF DESCRIPTION OF THE DRAWINGS

For a more complete understanding of the present invention and the advantages thereof, reference is now made to the following description and the accompanying drawings, in which.

DETAILED DESCRIPTION OF PREFERRED EMBODIMENTS

In the following, and as already shown in FIG. 1, the individual elements of the SRL chain are denoted as s(0) to s(n−1), where n is the length of the SRL chain. The depth of the RAM, which is a non-restrictive example of using a block memory, on the revised design is m. A superscript notation is used to denote the next state. For instance, s'(i) is the next state of the register element of the SRL at position i. Subscripts are used to differentiate between the golden and the revised designs. For instance, $d_g$ is the data input signal at the golden design. The corresponding data input in the revised design is dr.

The individual elements of the memory are referred to using lowercase ram. For instance, ram(k) is the kth location of the memory. RAM(i) is the memory element corresponding to the ith location in the SRL chain.

The present invention proposes a method of checking of equivalence between a first design 1 comprising an SRL chain 10 and a second design 2 comprising a memory block 20.

Figure 10:
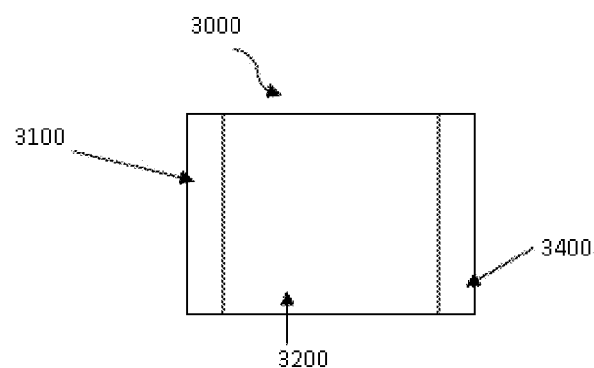
FIG. 10 is a system architecture diagram of a system for equivalence checking between a first design comprising a shift register logic SRL chain and a second design comprising a memory block in accordance with a preferred embodiment of the present invention.

A general architecture for a system for equivalence checking between a shift register chain SRL chain into an equivalent memory circuit in accordance with a preferred embodiment of the present invention is shown in FIG. 10. The system includes a computing device 3000, which may be a computer or server having one or more processors, a memory and a non-transitory storage medium such as a hard drive or solid state drive. The computing device 3000 has a proof module 3100, a verification module 3200, and equivalence checking module 3400. The computing device may have other modules or applications.

Figures 1A, 1B, 3:
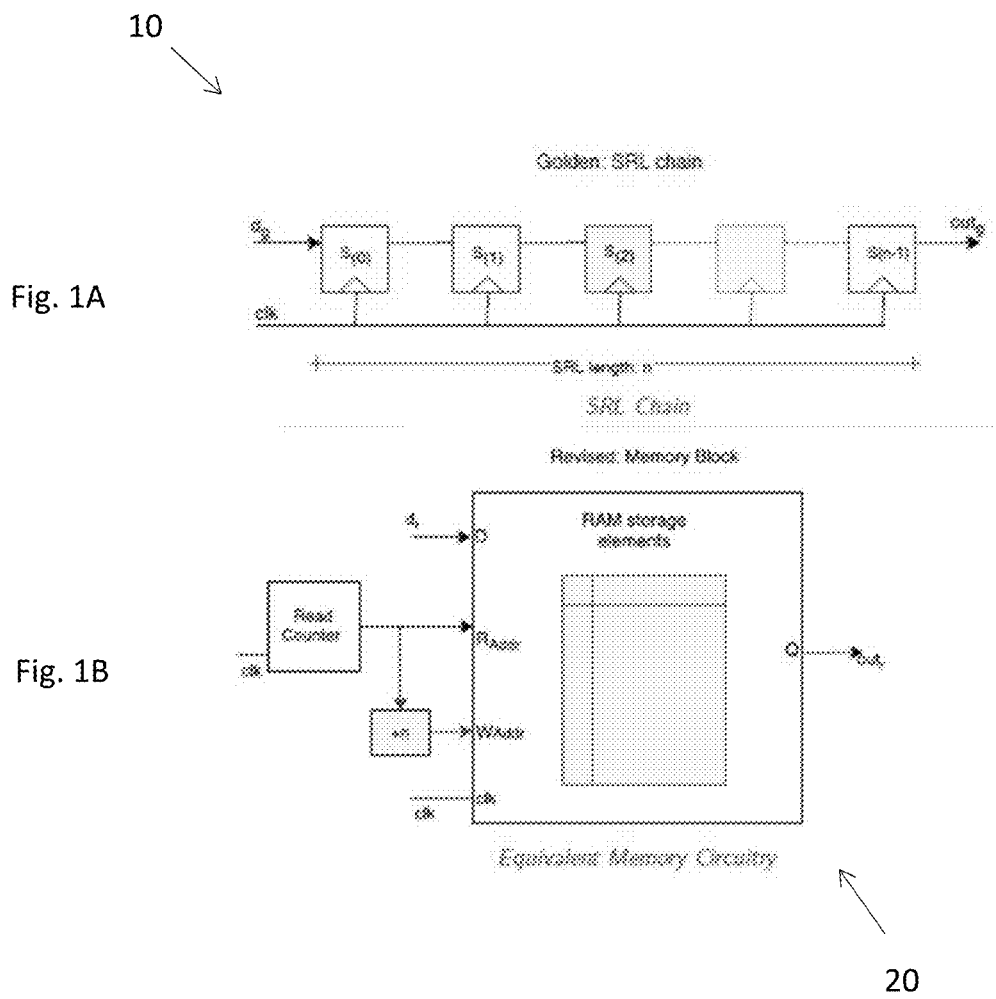
FIGS. 1A-1B illustrate a principle of a transformation between a shift register chain SRL chain into an equivalent memory circuitry.
FIG. 3 a flowchart of an equivalence checking between a shift register chain SRL chain into an equivalent memory circuitry.
Figure 4A:
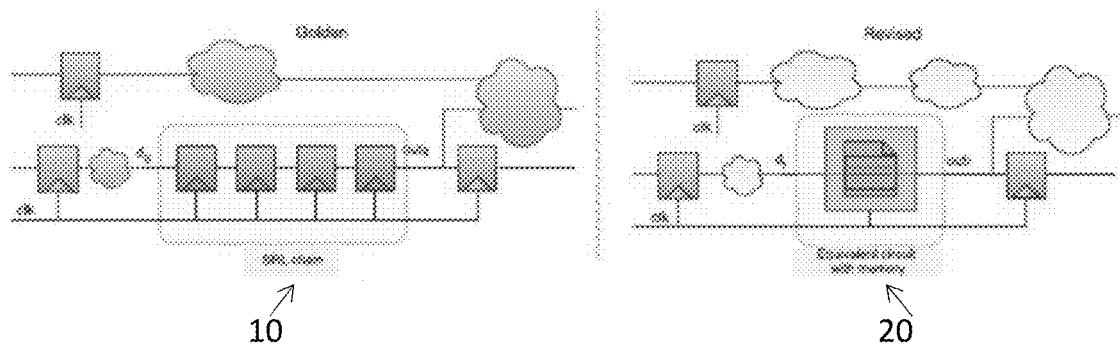
FIGS. 4A-4C illustrate a principle of an equivalence checking between a shift register chain SRL chain into an equivalent memory circuitry in an aspect of the present disclosure.

A general equivalence checking is depicted in FIG. 4A, together with the flowchart of FIG. 3.

In the following, the first design 1 is called "golden design", and the second design 2 is referred to as "revised design".

Figure 4B:
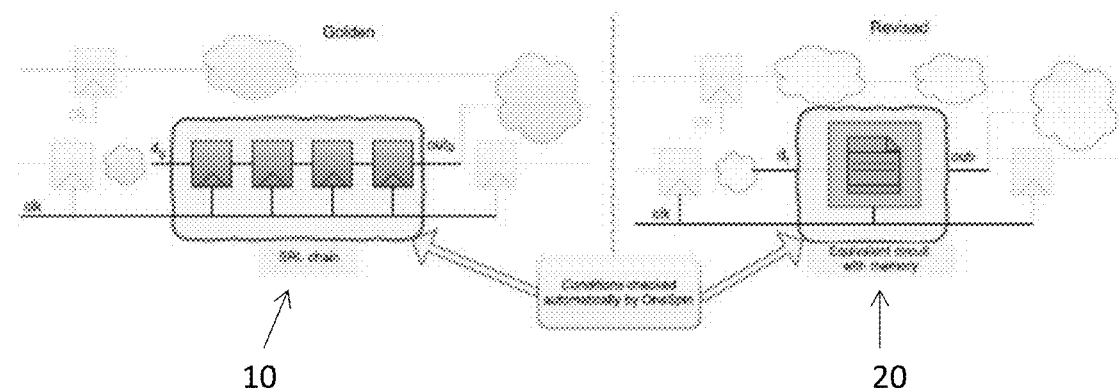
Figure 4C:
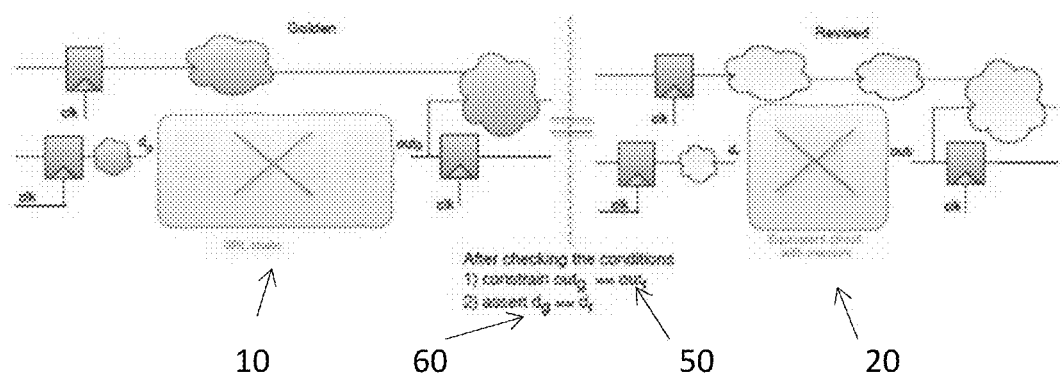

As shown in FIG. 4C, in the first stage, a plurality of conditions C1 to C5 in the golden design 1 and in the revised designs 2 are proved. These conditions establish that there exists a proper SRL chain 10 in the golden design 1 and properly composed memory 20 in the revised design 2. This step will be described later in the disclosure and can be performed by the proof module.

Once these necessary conditions C1 to C5 are proved, one or more constraints 50 are formed at the output $out_g$ of the golden SRL chain 10 and at the output outr the revised memory block 20 and an assertion 60 is added at the respective input $d_g$, dr. This is shown on FIG. 4C and can be performed by the verification module. The constraint(s) 50 state(s) that the respective outputs of the SRL and the memory block implementation are equivalent.

The equivalence checking problem further proceeds with these constraints and assertion and can be performed by the equivalence checking module. This means that the internal circuitry of the SRL or the memory block is not taken into consideration further and the complete equivalence checking problem can be decomposed into the individual stages described before. These theorems provide sufficient criteria to guarantee that the shift register logic and its implementation using a memory block are equivalent. Therefore, in subsequent steps, the internal implementation details of both the SRL chain in the golden design and the corresponding memory circuitry in the revised design can be ignored. This simplifies the remaining equivalence checking problem considerably, enabling scalable verification for industrial sized designs.

Hence, after establishment of the necessary conditions C1 to C5 in the golden and revised designs, the equivalence checking problem sums up to proving the constraint 50 that $out_r = out_g$, i.e. that the sink of the SRL and its implementation on the revised design are always delivering the same data. This corresponds to a decision that an inductive invariant has been identified.

The different stages of FIGS. 4B and 4C are described in the following sections.

The first stage shown on FIG. 4B consists in verifying a plurality of conditions corresponding to the transformation of the SRL chain 10 into the memory block 20. For the sake of convenience, the conditions are written with the acronym RAM for the memory block. It is noted that the memory block can be a RAM, SRAM, DRAM, Magnetic RAM, Block RAM etc. as the core element A first condition C.1 requires that the initial states for the golden and the revised are equivalent, as follows:

(a) $\forall_{i=0}^{n-1}(s(i)=0)$ (b) $\forall_{k=0}^{m-1}(ram(k)=0)$  Condition C.1

According to a second condition C2, the golden design implements a shift register.

Condition C.2

$$\forall_{i=0}^{n-1} s'(i) = \begin{cases} d_g & \text{if } i = 0 \\ s(i-1) & \text{otherwise} \end{cases} \quad (a)$$

$$out_g = s(n-1) \quad (b)$$

A third condition C.3 states that the revised design memory is written at the location pointed to by $W_{addr}$ and read from the location pointed to by Radar Condition C.3

$$\forall_{k=0}^{m-1} ram'(k) = \begin{cases} d_r & \text{if } k = W_{addr} \\ ram(k) & \text{otherwise} \end{cases} \quad (a)$$

$$out_r = ram(R_{addr}) \quad (b)$$

According to a fourth condition C4, the read and write addresses in the revised design maintain an offset n, the SRL chain length.

$W_{addr} = (R_{addr} + n) \% m$  Condition C.4

Finally, a fifth condition C.5 states that a write address $W_{addr}$ is implemented by a counter $W'_{addr} = (W_{addr} + 1) \% m$  Condition C.5

Once the plurality of conditions C1 to C5 has been introduced, a set of theorems for the transformation from the SRL chain 10 to the memory block 20 can be proved in order to prove the equivalence between the golden design 1 and the revised design 2, i.e. the invariant provided in the below equation:

$\forall_{i=0}^{n-1}(s(i) == RAM(i))$  Equation (1)

This correspond to the stage shown on FIG. 4C and the stage is explained below.

The first step is to derive a relationship between RAM(i) and ram(k). Recall that RAM(i) is the memory element corresponding to s(i), the ith SRL element, as explained with reference to FIGS. 1A-1B. Once again consider the individual steps in the example provided in FIG. 2. Here, n=4 and m=5 (number of storage elements in the memory). As the shift progresses in time w.r.t. the clock cycles, the $W_{addr}$ increments, whereas the position of the registers in the SRL chain remains the same.

Figure 2:
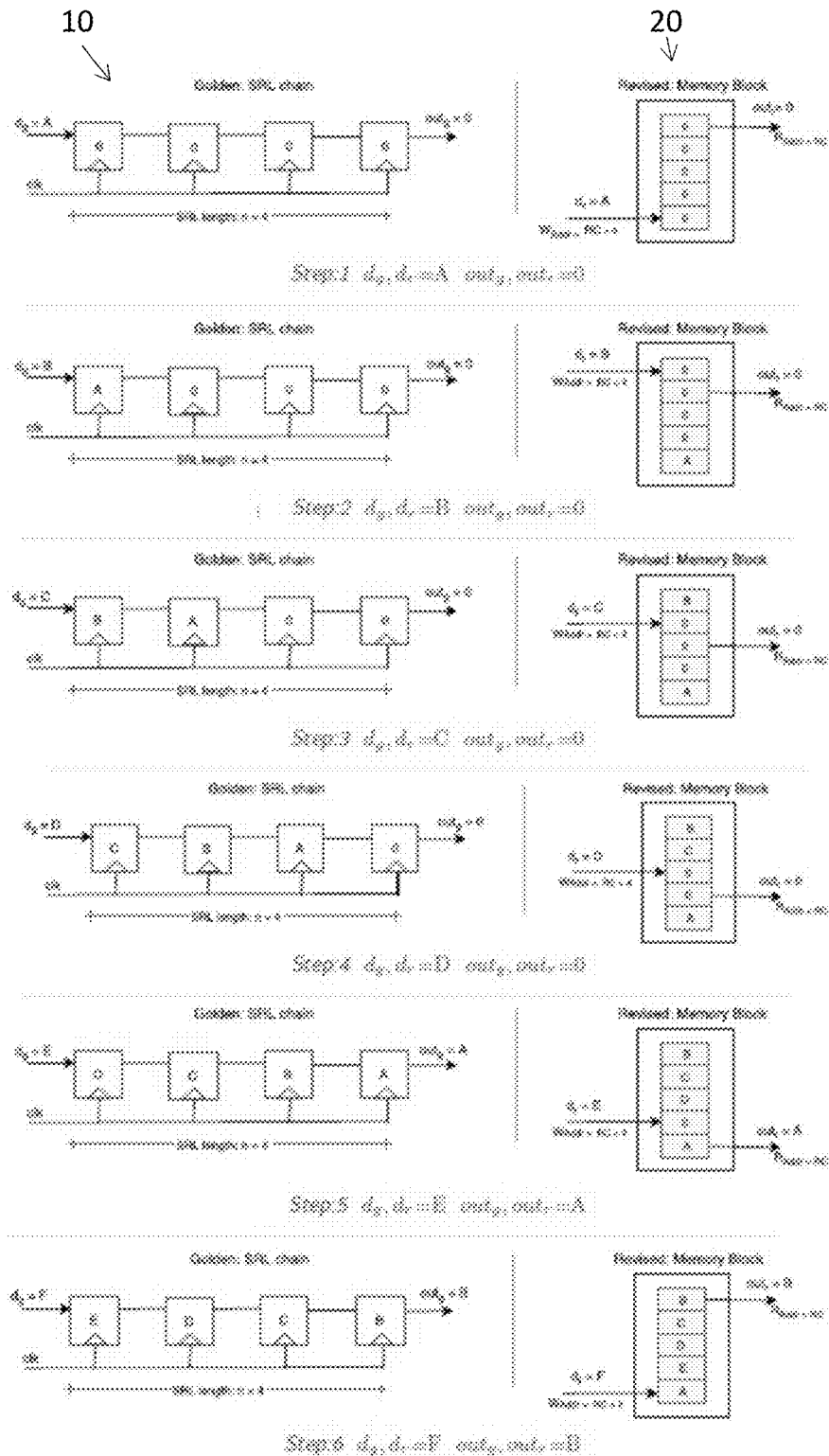
FIG. 2 illustration of a transformation between a shift register chain SRL chain into an equivalent memory circuitry.

For the example in FIG. 2 Step 4, $W_{addr}$ points to the 2nd storage cell and the following relations are derived RAM(0)=ram(($W_{addr}$-0-1)%5)=ram(1)

RAM(1)=ram(($W_{addr}$-1-1)%5)=ram(0)

RAM(2)=ram(($W_{addr}$-2<1)%5)=ram(4)

RAM(3)=ram(($W_{addr}$-3-1)%5)=ram(3)

Similarly, in FIG. 2 Step 5, $W_{addr}=3$ and $RAM(0)=ram (W_{addr}-0-1)=ram(2)$, and so on.

Summarizing the SRL shift pattern and the RAM storage locations, the relation can be generalized as follows:

$$RAM(i)=ram((W_{addr}-i-1)\%m) \quad \text{Equation (2)}$$

It should be noted that the variable n does not appear in Equation 2. Instead, the offset n is proved separately for the relationship between $W_{addr}$ and $R_{addr}$ in condition C.4.

Next, the set of theorems, namely theorem 1, theorem 2 and theorem 3, in the context of the equivalence verification is provided.

Theorem 1.

$$\forall_{i=0}^{m-1} Ram'(k) = \begin{cases} d_r, & \text{if } i = 0, \\ RAM(i-1) & \text{otherwise} \end{cases}$$

Proof
RAM(i)=ram(($W_{addr}$−i−1) % m)) from Equation (2)
RAM'(i)=ram'(($W'_{addr}$−i−1) % m))
RAM'(i)=ram'(($W_{addr}$−i) % m)) from Condition C.5
i=0:
RAM'(0)=ram'(($W_{addr}$) % m))
RAM'(0)=$d_r$ from Condition C.3
i>0:
RAM'(i)=ram'(($W_{addr}$−i) % m))
RAM'(i)=ram(($W_{addr}$−i))% m from Condition C.3
RAM'(i)=ram(($W_{addr}$−(i−1)−1) % m))
RAM'(i)=RAM(i−1) using Equation (2)
Theorem 2,
$\forall_{i=0}^{n-1} s(i)==RAM(i)$
Proof (induction)
Step 1: initial state equivalence from Condition
Step 2: s'(i)==RAM'(i)
i=0:
dg==dr assertion for input equivalence
i>0:
s(i−1)==RAM(i−1) using Theorem 1 and C.2 assertion for nut equivalence By virtue of the induction, the second theorem 2 proves that the SRL chain 10 in the golden design 1 is equivalent to the memory circuitry or memory block 20 in the revised design 2, if the conditions C.1 to C.5 are satisfied and the assertion 60 at the respective input sides holds.

Theorem 2 proves that the SRL chain 10 in the golden design is formally equivalent to the memory circuitry 20 in the revised design, leading to theorem 3:

Theorem 3.
$out_r=out_g$
Proof
$out_r=ram(R_{addr})$
$out_r=ram(((R_{addr}+n) \% m)-n) \% m$
$out_r=ram((W_{addr}-n) \% m)$ using Condition C.4
$out_r=RAM(n-1)$ using Equation (2)
$out_r=s(n-1)$ using Theorem 2
$out_r=out_g$ using Condition C.2

In other words, after proving the plurality of conditions C.1 to C.5, the following constraint 50 and assertion 60 are added to the complete equivalence checking problem:
  constrain $out_g==out_r$
  assert $d_g==d_r$
This means that for the subsequent steps of verification, the output signals of the SRL chain and of the memory block are assumed to be functionally equivalent when the inputs of the SRL chain and the memory block are driven by the same data. Hence, the internal circuitry of the SRL chain and of the memory block can be ignored.

In an embodiment for the transformation from an SRL chain to memory block and the verification techniques provided, the counting circuitry in the revised design is implemented using any of the counting schemes such as a binary counter, Gray counter, Johnson counter, ring counter, one-hot/one-cold encoded counter etc. For proving that the memory implementation is equivalent to the SRL in the golden design, the encoding or working of the counter is irrelevant. Important is that the effective offset between the read-address and the write-address is n (Condition 4).

Figure 5:
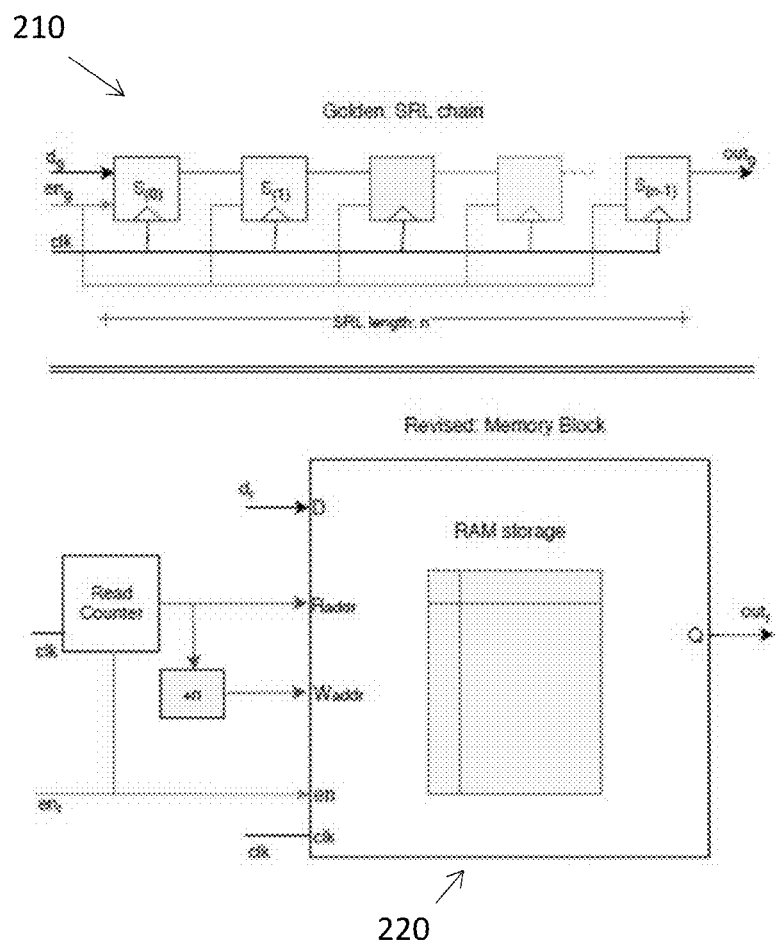
FIG. 5 a principle of a transformation between a shift register chain SRL chain into an equivalent memory circuitry in an aspect of the present disclosure.
Figure 6:
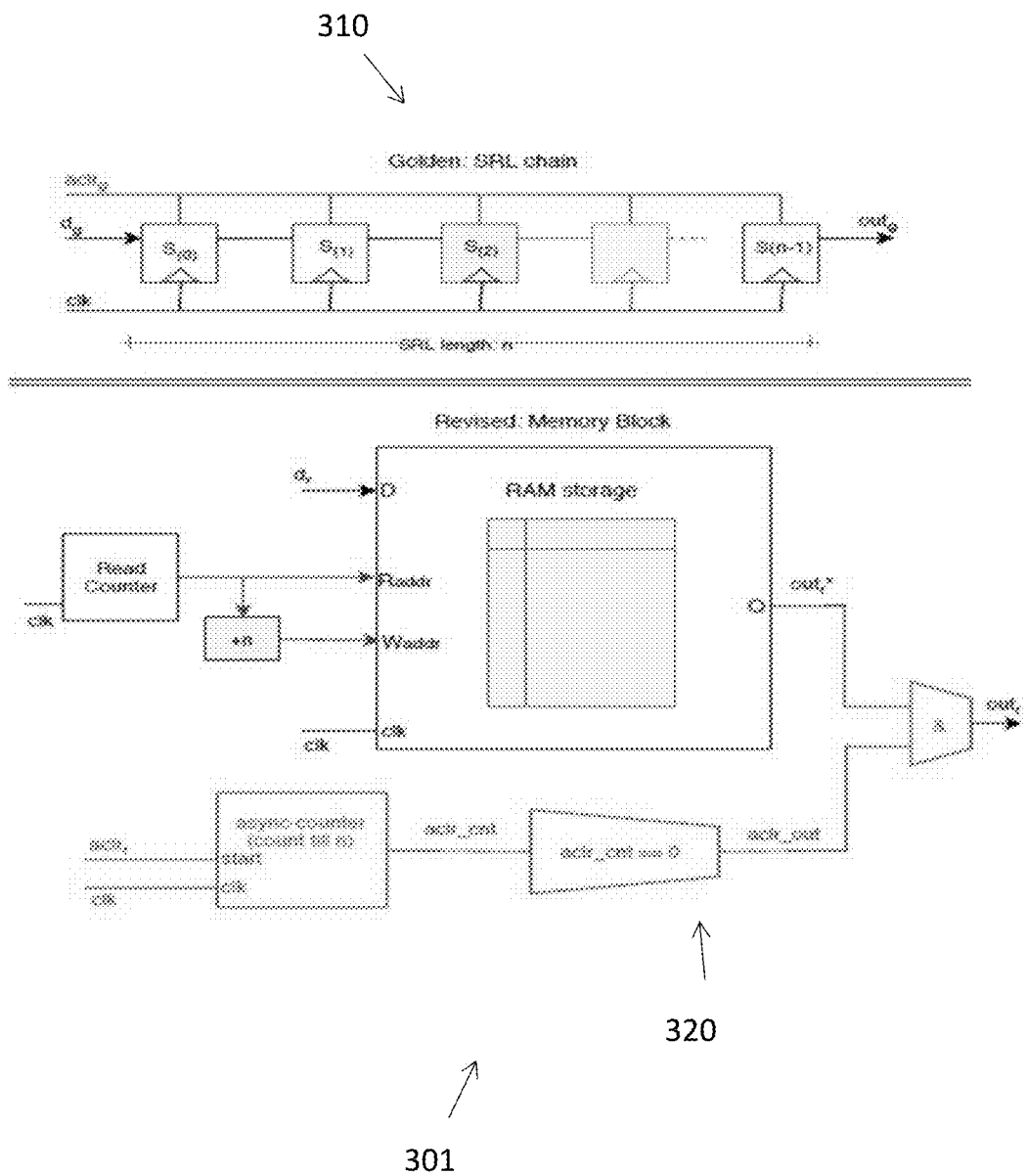
FIG. 6 a principle of a transformation between a shift register chain SRL chain into an equivalent memory circuitry in an aspect of the present disclosure.
Figure 7:
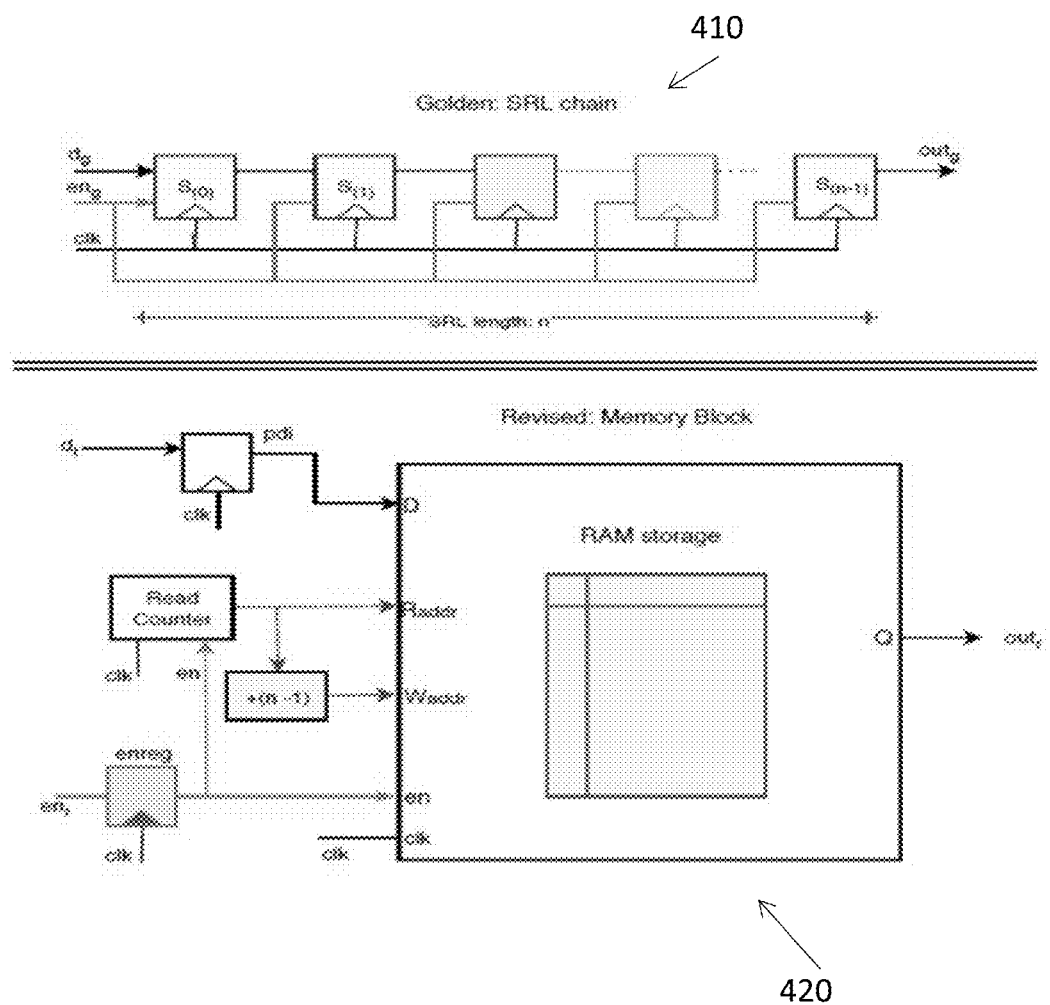
FIG. 7 a principle of a transformation between a shift register chain SRL chain into an equivalent memory circuitry in an aspect of the present disclosure.
Figure 8:
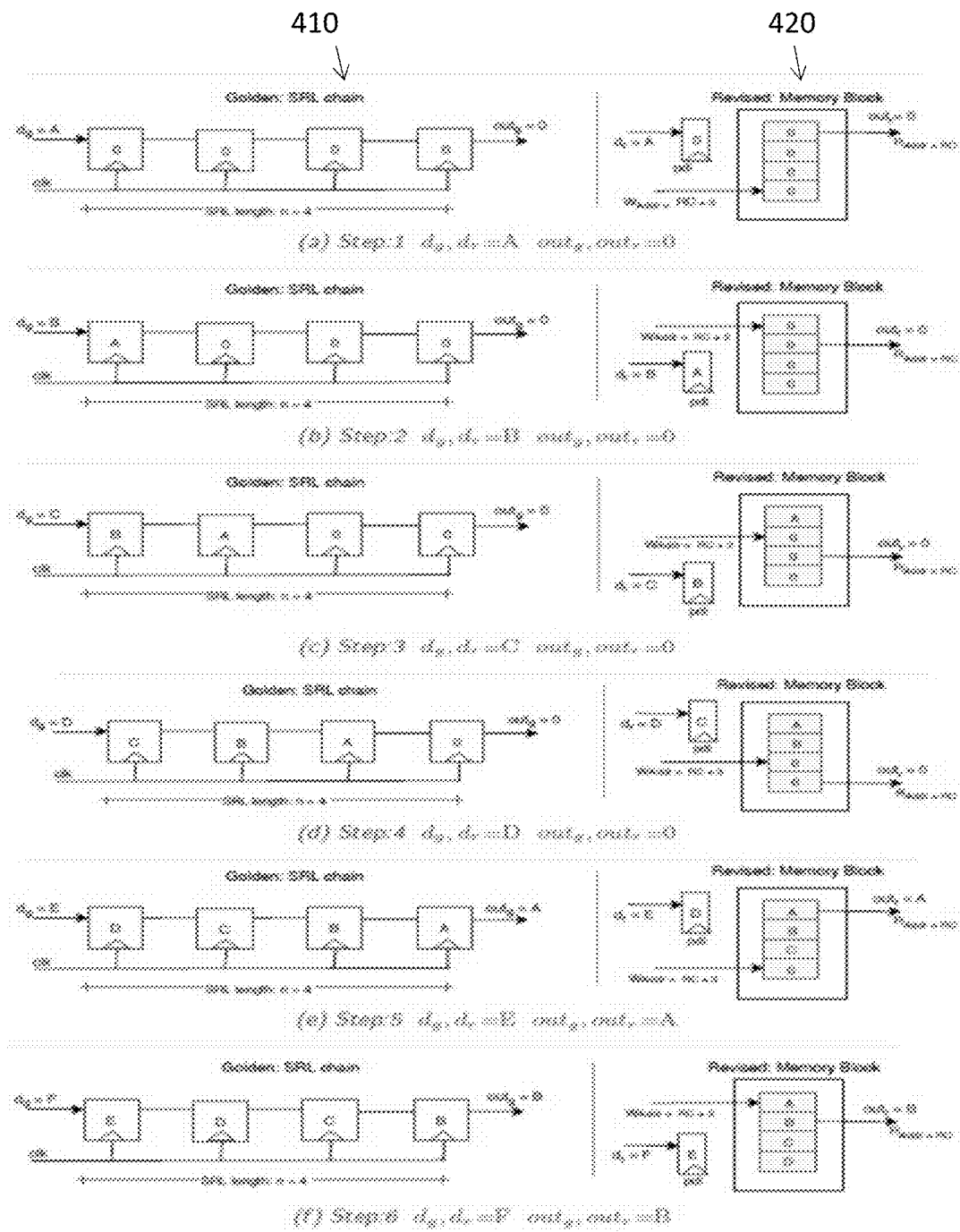
FIG. 8 a principle of a transformation between a shift register chain SRL chain into an equivalent memory circuitry in an aspect of the present disclosure.

In a second embodiment shown on FIG. 5, an enable signal is provided and the related modifications to the SRL chain 210 and the memory block circuitry 220 are shown in FIG. 5.

In order to check equivalence of the SRL chain 210 and the memory block 220 in the presence of enable signals, the plurality of conditions and the set of theorems can be modified to take into account said enable signal. Note that only those conditions that differ from the conditions of the first embodiment are listed in the following.

The golden design 210 implements a shift register.

$$\forall_{i=0}^{n-1} s'(i) = \begin{cases} s(i), & \text{if } en_g = 0 \\ d_g, & \text{if } i = 0 \wedge en_g = 1 \\ s(i-1), & i > 0 \wedge en_g = 1 \end{cases} \quad (a)$$

$$out_g = s(n-1) \quad (b)$$

The revised design memory 220 is written at the location pointed by $W_{addr}$ and read from the location $R_{addr}$ $$\forall_{k=0}^{m-1} ram'(k) = \begin{cases} d_r & \text{if } k = W_{addr} \wedge en_r = 1 \\ ram(k) & \text{otherwise} \end{cases} \quad (a)$$

$$out_r = ram(R_{addr}) \quad (b)$$

The write address $W_{addr}$ is implemented by a counter.

$$W'_{addr} = \begin{cases} (W_{addr} + 1) \% m & \text{if } en_r == 1 \\ W_{addr} & \text{otherwise} \end{cases} \quad (a)$$

The modified theorems incorporating the enable signal are as follows. It should be noted that both statement and proof of Theorem 3 is unaffected by the addition of the enable signal and as such omitted in the following.

Theorem 1.

$$\forall_{i=0}^{m-1} RAM'(i) = \begin{cases} RAM(i), & \text{if } en = 0 \\ d_r, & \text{if } i = 0 \wedge en = 1 \\ RAM(i-1), & \text{if } i > 0 \wedge en = 1 \end{cases} \text{from Equation (2)}$$

Proof
$RAM(i) = ram((W_{addr} - i - 1) \% m))$
$RAM'(i) = ram'((W'_{addr} - i - 1) \% m))$
en = 0:                   using Conditions C.5 and C.3
$RAM'(i) = RAM(i)$
en = 1:
Same as in proof of
    Theorem 1 in the basic framework.

Theorem 2.

$\forall_{i=0}^{n-1} s(i) == RAM(i)$

Proof (induction)

Base Case: initial state equivalence from Condition C.1

Inductive Step en=0:

$\forall_{i=0}^{n-1}(s'(i)==s(i))^\wedge \forall_{k=0}^{m-1}(ram'(k)==ram(k))$

Same as in proof of Theorem 2 in the first embodiment

In yet a third embodiment an asynchronous clear (aclr) is provided. This results in additionally the register elements being cleared when an aclr signal is provided. Once the SRL registers are cleared it takes n steps for the next input to be shifted to the output. All the stored data before the aclr signal is cleared. The synthesis tool can choose to implement this in a variety of techniques; for e.g., clear the respective memory elements or delay the aclr signal for n-cycles and gate (Boolean AND) the output of the memory with this delayed aclr signal (aclr-out). For equivalence checking, it needs to be sufficient only to verify that the memory-output is cleared for n-cycles and has valid data at the end of n cycles, after aclr signal is asserted. This results in the condition C3 being gated with an additional aclr-out signal which is an n-cycle delayed version of aclr. Note that the polarity of aclr signal (active low or active high) need to be taken care in the memory output gating signal aclr-out also.

The condition C.3, which provides that the revised design memory is written at the location pointed by $W_{addr}$ and read from the location Radar, in the presence of asynchronous clear is given below condition C3

$$\forall_{k=0}^{m-1} ram'(k) = \begin{cases} d_r & \text{if } k = W_{addr} \\ ram(k) & \text{otherwise} \end{cases} \quad (a)$$

$$out_r = ram(R_{addr}) \wedge adr\_out \quad (b)$$

In yet a fourth embodiment a synchronous reset (rst) is provided. This embodiment is the same as the previous embodiment. The condition C3 need to be gated with an additional rst-out signal which is an n-cycle delayed version of the original rst signal.

In yet a fifth embodiment, the synthesis tool can also choose to buffer the input stage in the revised memory 420. In this type of SRL2MEMORY transformation, the input of the revised memory, dr, is sampled with one or more registers. The number of such register stages before the memory block is p. In this case, the first p stages are checked using standard equivalence checking techniques and the next (n-p) stages are verified using the verification techniques in first embodiment with a modification of the effective length of the SRL from n to (n-p).

In yet a sixth embodiment, the synthesis tool can also choose to delay the enable signal in the revised memory of the second embodiment. This type of SRL2MEMORY transformation needs to be balanced with an additional input stage register. The enable signal after buffering is called enreg. Here it is only sufficient to verify the revised design storage locations are written and read incorporating the enreg signal (Condition C3) and the counter mechanism also takes enreg into consideration (Condition C5)

C.3 The revised design storage locations are properly written and read:

$$pdi' = d_r \quad (a)$$

$$\forall_{k=0}^{m-1} ram'(k) = \begin{cases} pdi, & \text{if } k = W_{addr} \wedge enreg = 1 \\ ram(k) & \text{otherwise} \end{cases} \quad (b)$$

$$out_r = ram(R_{addr}) \quad (c)$$

C.5 Revised design has a proper write address mechanism, $W_{addr}$, that functions as a counter.

$$W'_{addr} = \begin{cases} (W_{addr} + 1) \% m & \text{if } enreg == 1 \\ W_{addr} & \text{otherwise} \end{cases} \quad (a)$$

Figure 9:
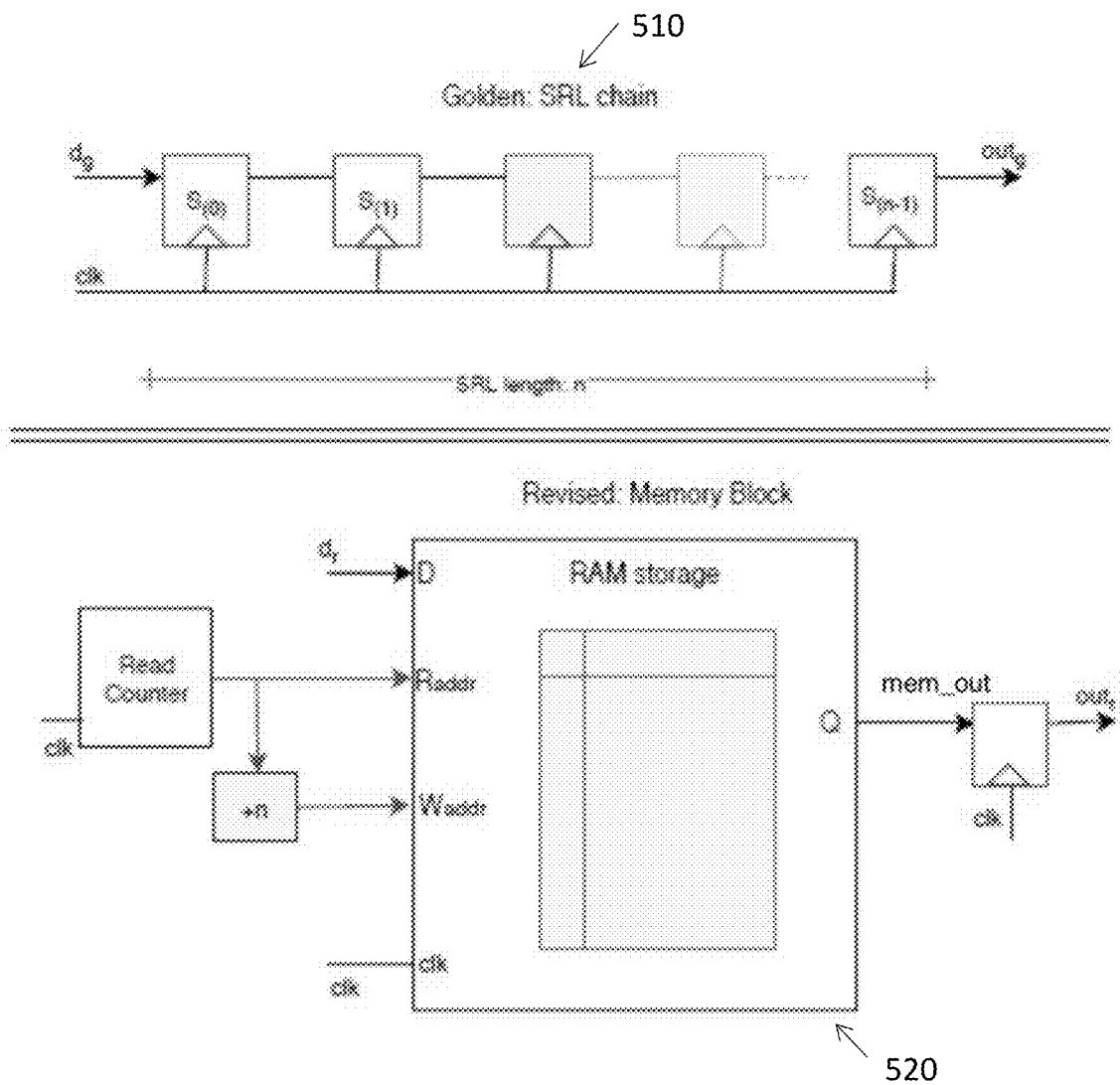
FIG. 9 a principle of a transformation between a shift register chain SRL chain into an equivalent memory circuitry in an aspect of the present disclosure.

In yet a seventh embodiment, one or more registers at the output of the memory can be inserted. The corresponding synthesis transformation from an SRL chain 510 to a memory block 520 is shown in FIG. 9. The output of the core memory block 520 is the signal mem_out. This signal is sampled through one or more stages of output register before the final outr, is emitted. The number of output stage registers is specific to the synthesis tool and the targeted device technology. For equivalence checking, we can consider the register driven by mem_out signal as a last element in the memory block instead of a separate stage. i.e., ram(m-1)=mem_out. Using this notation, the initial conditions to be proved and the associated theorems are the same as in the first embodiment with reference to FIGS. 1A-1B. The theorems and the methodology provided with reference to FIG. 1A-1B can be applied directly to the synthesis with output registers. The number of such output stages if needed is deduced using state reachability analysis.

In yet another embodiment, the SRL2MEMORY transformation is applied to SRL chains where width is more than 1. In this case, the individual chains get mapped to the successive bits of the same word of the memory in the revised design. This can result in parallel or cascaded RAM configurations, when the word length does not match the SRL chain width. The formal verification theory of the present disclosure is applied directly without any modification in such situations also. In this case, each SRL chain is taken separately and verified one at a time.

Finally, it should be noted that the memory topology can vary, for example the memory elements may be arranged in a cascaded fashion in the revised block as a result of synthesis irrespective of the width of the SRL chain. This does not change the verification method explained in the present disclosure.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

The invention claimed is:

1. A computer implemented method of checking equivalence between a first design comprising a shift register logic SRL chain and a second design comprising a memory block comprising a read-address and a write-address, the method comprising:

verifying a plurality of conditions corresponding to a transformation of the SRL chain into the memory block, wherein the plurality of conditions comprise the following conditions:

C1) the initial states for the SRL chain and the memory block are equivalent,
C2) the first design implements a shift register,
C3) the revised memory block is written at the location pointed to by a write address and read from the location pointed to by a read address,
C4) the read and write addresses in the revised memory block maintain an offset n, and
C5) the write address is implemented by a counter;
checking that the plurality of conditions hold, in order to prove that the SRL chain in the first design is formally equivalent to the memory block in the second design, replacing the SRL chain and the memory block by a set of constraints, wherein the replacing comprising removing the SRL chain and the memory block circuit and the set of constraints comprises the assertion dg=dr that the input data of SRL chain in the first design and the input data of the memory block in the second design are equivalent and the assumption outg=outr that the output data of SRL chain in the first design and the output data of the memory block in the second design are equivalent; and
applying equivalence checking between the first design and the second design, wherein internal implementation details of the SRL chain in the first design and of the memory block in the second design are ignored during the equivalence checking.

2. The method of claim 1, comprising checking the validity of the replacement step, the method comprises verifying of a set of theorems using said plurality of conditions to prove that the SRL chain in the first design is formally equivalent to the memory circuitry in the second design, whereby if the plurality of conditions hold, the validity of said replacement step follows from said set of theorems.

3. The method according to claim 1, wherein the method comprises maintaining an offset between the read-address and the write-address, whereby the offset corresponds to the length of the SRL chain.

4. The method of claim 1, wherein a counting scheme in the revised with an effective offset between the read address and the write address is maintained.

5. The method of claim 1, wherein an enable signal is provided.

6. The method of claim 1, wherein an asynchronous clear is provided, so that registers of the SRL chain can be directly reset using the asynchronous clear signal.

7. The method of claim 4 wherein a synchronous reset is provided, so that the registers of the SRL chain can be synchronously reset using the synchronous reset signal with respect to the clock signal.

8. The method of claim 1, wherein the input stage of the memory block is buffered with one or more stages of input registers.

9. The method of claim 8, wherein an effective offset between the read address and write address of the memory block is the difference between the length of the SRL chain (n) and the number of the one or more stages of input registers (p), to account for p stages of input registers.

10. The method of claim 1, wherein the enable signal is registered to form a delayed signal (enreg) which is further applied as the enable signal of the memory block storage elements.

11. The method of claim 1, where the output of the memory is buffered with one or more stages of the output registers in the revised side.

12. The method of claim 11, wherein the number of such output registers after the core memory block is deduced using state-reachability analysis.

13. The method of claim 1, wherein the revised memory result in a parallel or cascaded memory configuration.

14. The method of claim 1, wherein the width of the SRL chain is more than one.

15. A non-transitory computer-readable storage medium having stored therein software instructions that, when executed by a processor, cause the processor to perform a method of checking equivalence between a first design comprising a shift register logic SRL chain and a second design comprising a memory block comprising a read-address and a write-address, the method comprising:
verifying a plurality of conditions corresponding to a transformation of the SRL chain into the memory block, wherein the plurality of conditions comprises the following conditions:
C1) the initial states for the SRL chain and the memory block are equivalent,
C2) the first design implements a shift register,
C3) the revised memory block is written at the location pointed to by a write address and read from the location pointed to by a read address,
C4) the read and write addresses in the revised memory block maintain an offset n, and
C5) the write address is implemented by a counter;
checking that the plurality of conditions hold, in order to prove that the SRL chain in the first design is formally equivalent to the memory block in the second design, replacing the SRL chain and the memory block by a set of constraints, wherein the replacing comprising removing the SRL chain and the memory block circuit and the set of constraints comprises the assertion dg=dr that the input data of SRL chain in the first design and the input data of the memory block in the second design are equivalent and the assumption outg=outr that the output data of SRL chain in the first design and the output data of the memory block in the second design are equivalent; and
applying equivalence checking between the first design and the second design, wherein internal implementation details of the SRL chain in the first design and of the memory block in the second design are ignored during the equivalence checking.

* * * * *